(No Model.)
J. P. JOHNSON.
TOOL HANDLE.
No. 298,695. Patented May 13, 1884.
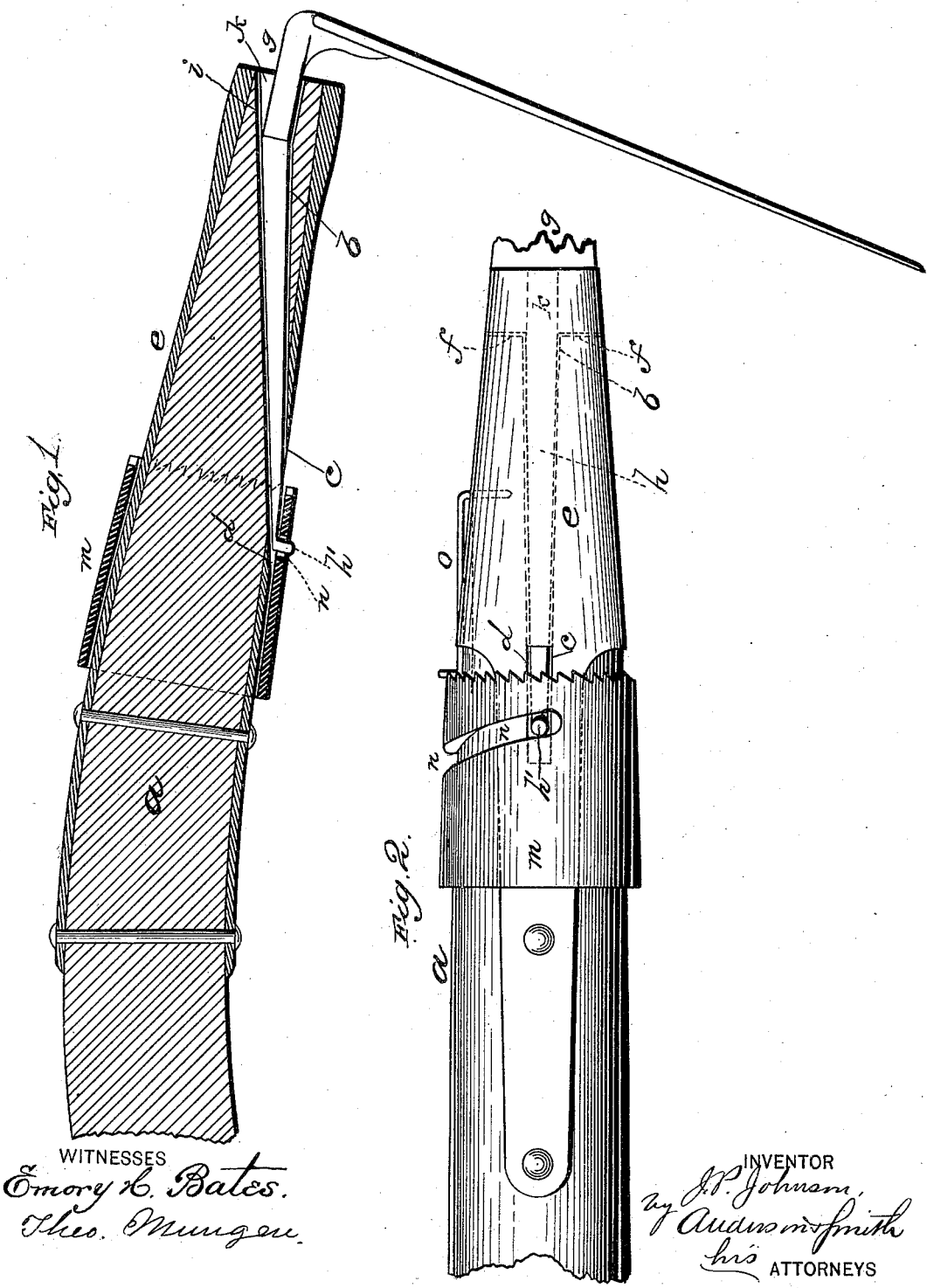
WITNESSES
Emory H. Bates.
Theo. Mungen.
INVENTOR
J. P. Johnson,
by Anderson & Smith
his ATTORNEYS

UNITED STATES PATENT OFFICE.

JAMES P. JOHNSON, OF WASHINGTON, DISTRICT OF COLUMBIA, ASSIGNOR OF ONE-HALF TO ARTHUR W. TANCIL, OF SAME PLACE.

TOOL-HANDLE.

SPECIFICATION forming part of Letters Patent No. 298,695, dated May 13, 1884.

Application filed September 24, 1883. (No model.)

*To all whom it may concern:*

Be it known that I, JAMES PEYTON JOHNSON, a citizen of the United States, residing at Washington, in the District of Columbia, have invented certain new and useful Improvements in Handles for Farm and Garden Tools; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a longitudinal sectional view of my invention, showing a hoe-blade applied; and Fig. 2 is a plan view of the tang with the handle partly broken away.

This invention has relation to handles for farm and garden tools; and it consists in the construction and novel arrangement of devices, as will be hereinafter fully described, and particularly pointed out in the claims appended. This handle is intended to be applied to hoes, rakes, pitchforks, weed-cutters, and other farm or garden tools, and is designed to be used interchangeably with this class of implements.

Referring by letter to the accompanying drawings, $a$ designates the wooden portion of the handle, which may be of any suitable dimensions, and which is preferably curved or bent for convenience in manipulation. An inclined tang-seat, $b$, commencing at the ferrule end of the handle, terminates in a slot, $c$, in the under side of the wooden handle, which slot $c$ registers with a slot, $d$, in a bifurcated socket, $e$, of metal, in which the wooden handle is seated and secured by bolts passed through its bifurcated portions only. The point of the socket is made quite heavy, to withstand the strain attending the use of the implement. The socket $e$ is provided with rectangular recesses $ff$ at the sides in its point, which form seats for the rectangular portion of the head $g$ of the tang $h$ of the tool or implement. An inclined seat, $i$, is formed in the upper side of the wooden handle $a$ in line with the inclined upper wall of the inclined tang-seat $b$, and at a right angle to the metal seats $ff$. This inclined seat is intended to receive an inclined lug, $k$, on the upper face of the tang-head when the tool is attached to the handle. The point of the tang $h$ is provided with a toe, $h'$, which, when the tang is in its seat, projects through the terminating registering slots of the handle and socket. The head of the tang is so arranged as to fit the seats $ff$, which are not inclined. A detachable sleeve, $m$, of metal, is provided with a semi-spiral slot, $n$, which engages the toe $h$, near the forward end of the slot $n$, and is turned around on the handle after the sleeve has been slipped to place over the spring $o$, seated in a recess in the side of the handle. The front edge of the sleeve is provided with ratchet-teeth, which engage the rear end of the spring $o$ and prevents the sleeve from turning accidentally backward, and also prevents the sleeve from slipping forward while the implement is being used. The shoulder or lug resting in the inclined seat, together with the tang-head in the recesses $ff$, prevents any lateral play of the tool in its seat.

This device is simple, cheap, and durable. Each interchangeable tool should have the tang, with the head, lug, and toe, hereinbefore described. Even if the tools are not intended to be interchangeable, they may be provided with this improved handle, and in case they become broken, dulled, or need replacing, temporarily or otherwise, this handle may be used to advantage.

Having thus fully described my invention, what I claim as new, and desire to secure by Letters Patent, is—

1. The combination, in a handle for farm or garden tools, with the inclined tang-seat and metal socket having the recesses $ff$ and registering terminating-slots and inclined seat in its ferrule end, of the tang having the head provided with an inclined lug to fit the inclined recess or seat, and a toe, $h$, at its point, and the slotted ratcheted sleeve engaging the toe by its slot and a retaining-spring by its ratchet to hold the tool in place, substantially as specified.

2. The combination, with the handle and the tang seated in an inclined tang-seat, and provided with a toe at its point, of the retaining-spring and the ratcheted slotted sleeve, substantially as specified.

In testimony whereof I affix my signature in presence of two witnesses.

JAMES P. JOHNSON.

Witnesses:
   THEO. MUNGEN,
   JOHN D. MORROW.